United States Patent
Chen et al.

(10) Patent No.: US 9,251,475 B2
(45) Date of Patent: Feb. 2, 2016

(54) SELECTING STRANGERS FOR INFORMATION SPREADING ON A SOCIAL NETWORK

(71) Applicant: International Business Machines Corporation, Armonk, NY (US)

(72) Inventors: Jilin Chen, Mountain View, CA (US); Kyumin Lee, College Station, TX (US); Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/874,800

(22) Filed: May 1, 2013

(65) Prior Publication Data

US 2014/0330757 A1    Nov. 6, 2014

(51) Int. Cl.
G06F 15/18    (2006.01)
G06N 99/00    (2010.01)

(52) U.S. Cl.
CPC .................................... *G06N 99/005* (2013.01)

(58) Field of Classification Search
CPC ............................... G06N 5/048; G06F 15/18
See application file for complete search history.

(56) References Cited

U.S. PATENT DOCUMENTS

| | | | |
|---|---|---|---|
| 6,278,996 B1 | 8/2001 | Richardson et al. | |
| 6,389,400 B1 | 5/2002 | Bushey et al. | |
| 7,720,835 B2 | 5/2010 | Ward et al. | |
| 7,783,710 B2 | 8/2010 | Ramaswamy | |
| 7,933,843 B1 | 4/2011 | von Groll et al. | |
| 8,156,064 B2 | 4/2012 | Brown | |
| 8,275,769 B1 | 9/2012 | Suh et al. | |
| 8,312,056 B1 | 11/2012 | Peng et al. | |
| 2009/0299993 A1 | 12/2009 | Novack | |
| 2010/0076850 A1 | 3/2010 | Parekh et al. | |
| 2011/0078306 A1 | 3/2011 | Krishnamurthy | |
| 2011/0131145 A1 | 6/2011 | Soza et al. | |
| 2011/0307397 A1 | 12/2011 | Benmbarek | |
| 2012/0072384 A1 | 3/2012 | Schreiner et al. | |
| 2012/0095976 A1 | 4/2012 | Hebenthal et al. | |
| 2012/0102113 A1 | 4/2012 | Chartier et al. | |

(Continued)

OTHER PUBLICATIONS

"'Make New Friends, but Keep the Old"—Recommending People on Social Networking Sites': Chen, 2009, ACM, 978-1-60558-246, pp. 201-210.*

(Continued)

*Primary Examiner* — Kakali Chaki
*Assistant Examiner* — Peter Coughlan
(74) *Attorney, Agent, or Firm* — Edward P. Li (57) ABSTRACT

A computer-implemented method, computer program product, and computer system for selecting strangers for information spreading on a social network. For the strangers who are users of the social network and not related to each other, information spreading probabilities based on features, information reach, and information spreading probabilities based on a wait time are computed. Fitness scores of the strangers are computed; the fitness scores are a function of the information spreading probabilities, the information reach, and the information spreading probabilities. The strangers are ranked, based on the fitness scores, in a sorted set. One or more of the strangers for the information spreading are selected from the sorted set. The one or more of the strangers for the information spreading are selected by determining an interval in the sorted set, and the interval satisfies an optimization objective of minimizing time for the information spreading within a confidence probability.

17 Claims, 5 Drawing Sheets

(56) References Cited

U.S. PATENT DOCUMENTS

| | | |
|---|---|---|
| 2012/0143958 A1 | 6/2012 | Augustine |
| 2012/0150631 A1 | 6/2012 | Root et al. |
| 2012/0185472 A1 | 7/2012 | Ahmed et al. |
| 2012/0198015 A1 | 8/2012 | Gorti et al. |
| 2012/0259915 A1 | 10/2012 | Bhatt et al. |

OTHER PUBLICATIONS

'Personalized Recommendation in Social Network Sites': Chen, 2011, dissertation, Univ of Minnesota.*

'Who Will Retweet This? Automatically Identifying and Engaging Strangers on Twitter to Spread Information': Lee, ACM, 2014, 1-4503-2184-6, pp. 247-256.*

'When Will You Answer This? Estimating Response Time in Twitter': Mahmud, 2013, Assoc for the advancement of Artificial Intelligence, pp. 697-700.*

'Earthquake Shakes Twitter Users: Real-time Event Detection by Social Sensors': Sakaki, 2010, ACM 978-1-60558-799-8, pp. 851-860.*

Wang et al.; "Identifying Information Spreaders in Twitter Follower Networks", Technical Report, TR-12-001, School of Computing, Informatics, and Decision Systems Engineering, Arizona State University, Tempe, AZ 85287, 2012, 10 pages.

warriorforum.com, "WarriorForum—Internet Marketing Forums", Jul. 26, 2011, pp. 1-4, Internet Warriors, USA.

Watts et al.; "Influentials, Networks, and Public Opinion Formation", Journal of Consumer Research (in press, Dec. 2007), Department of Sociology, Columbia University, New York, NY, 10025, Department of Mathematics and Statistics, University of Vermont, Burlington VT, 05404.

Weng et al., "TwitterRank: Finding Topic-sensitive Influential Twitterers", WSDM '10 Feb. 4-6, 2010, New York City, New York, USA, Copyright 2010 ACM 978-1-60558-889-6/10/02.

Wikipedia, "Big Five Personality Traits", Mar. 22, 2011, p. 1-14, wikipedia.org.

answers.yahoo.com, "Yahoo! Answers", Jul. 24, 2011, pp. 1-4.

Yang et al., "A Comparative Study on Feature Selection in Text Categorization", ICML '97 Proceedings of the Fourteenth International Conference on Machine Learning, ACM 1-55860-486-3.

Yarkoni, T., "Personality in 100,000 Words: A Large-Scale Analysis of Personality and Word Usage Among Bloggers", Journal of Research in Personality, 44 (2010) pp. 363-373, Copyright 2010 Elsevier, Inc.

Agarwal et al., "Identifying the Influential Bloggers in a Community", WSDM'08, Feb. 11-12, 2008, Palo Alto, California, USA. Copyright 2008 ACM 978-1-59593-927-9/08/0002.

Avrahami, D. et al., "Responsiveness in Instant Messaging: Predictive Models Supporting Inter-Personal Communication", CHI 2006 Proceedings, Using Knowledge to Predict & Manage, Apr. 22-27, 2006, Montreal, Quebec, Canada, pp. 731-740, Copyright 2006 ACM 1-59593-178-3/06/0004.

Bakshy et al., "Everyone's an Influencer: Quantifying Influence on Twitter", WSDM'11, Feb. 9-12, 2011, Hong Kong, China. Copyright 2011 ACM 978-1-4503-0493-1/11/02.

Bakshy et al., "The Role of Social Networks in Information Diffusion", WWW 2012, Apr. 16-20, 2012, Lyon, France. Copyright International World Wide Web Conference Committee (IW3C2), ACM 978-1-4503-1229-5/12/04.

Begole et al., "Work Rhythms: Analyzing Visualizations of Awareness Histories of Distributed Groups", Proceedings of the 2002 ACM Conference on Computer Supported Cooperative Work (CSCW '02), Nov. 16-20, 2002, New Orleans, Louisiana, USA, pp. 334-343, Copyright 2002 by Sun Microsystems, Inc.

Bouguessa et al., "Identifying Authoritative Actors in Question-Answering Forums—The Case of Yahoo! Answers", KDD '08, Aug. 24-27, 2008, Las Vegas, Nevada, USA, Copyright 2008, pp. 866-874.

Boyd et al., "Tweet, Tweet, Retweet: Conversational Aspects of Retweeting on Twitter", Proceedings of the 43rd Hawaii International Conference on System Sciences—2010, Copyright 2010 IEEE, 978-0-7695-3869-3/10.

Budak et al., "Limiting the Spread of Misinformation in Social Networks", WWW '11 Proceedings of the 20th International Conference on World Wide Web, ACM 978-1-4503-0632-4.

Carbonell et al., "Computer Models of Human Personality Traits", Original Publication Date: Nov. 30, 1979, IP.com Electronic Publication: Mar. 29, 2007, IP.com [online], Retrieved from: Prior Art Database, IP.com No. IPCOM000148139D.

Castillo et al., "Information Credibility on Twitter", WWW 2011, Mar. 28-Apr. 1, 2011, Hyderabad, India. Copyright International World Wide Web Conference Committee (IW3C2), ACM 978-1-4503-0632-4/11/03.

Cha et al., "Measuring User Influence in Twitter: the Million Follower Fallacy", Proceedings of the Fourth International AAAI Conference on Weblogs and Social Media, Copyright 2010 Association for the Advancement of Artificial Intelligence (www.aaai.org), pp. 10-17.

Cha et al., "The World of Connections and Information Flow in Twitter", IEEE Transactions on Systems, Man and Cybernetics, Part A: Systems and Humans, vol. 42: No. 4, Jul. 2012, pp. 991-998.

Chaoji et al., "Recommendations to Boost Content Spread in Social Networks", WWW 2012—Session: Information Diffusion in Social Networks, Apr. 16-20, 2012, Lyon, France. Copyright International World Wide Web Conference Committee (IW3C2), ACM 978-1-4503-1229-5/12/04.

Chawla et al., "SMOTE: Synthetic Minority Over-sampling Technique", Journal of Artificial Intelligence Research 16 (2002) 321-357, Submitted Sep. 2001; published Jun. 2002, Copyright 2002 AI Access Foundation and Morgan Kaufmann Publishers.

Cheng et al., "You Are Where You Tweet: A Content-Based Approach to Geo-Locating Twitter Users", CIKM '10, Oct. 26-30, 2010, Toronto, Ontario, Canada, pp. 759-768, Copyright 2010 ACM 978-1-4503-0099-5/10/10.

Cosley et al., "Sequential Influence Models in Social Networks", Proceedings of the Fourth International AAAI Conference on Weblogs and Social Media, Copyright 2010 Association for the Advancement of Artificial Intelligence (www.aaai.org).

Cosley et al., "SuggestBot: Using Intelligent Task Routing to Help People Find Work in Wikipedia", Proceedings of the 12th International Conference on Intelligent User Interfaces (IUI '07), Jan. 28-31, 2007, Honolulu, Hawaii, USA, Copyright 2007 ACM 1-59593-481-2/07/0001, pp. 32-41.

De Choudhury et al., "How Does the Data Sampling Strategy Impact the Discovery of Information Diffusion in Social Media", Proceedings of the Fourth International AAAI Conference on Weblogs and Social Media, Copyright 2010 Association for the Advancement of Artificial Intelligence (www.aaai.org).

Disclosed Anonymously, "Deriving Pollution Origin from Social Data", IP.com Electronic Publication: Apr. 29, 2011, IP.com [online], Retrieved from: Prior Art Database, IP.com No. IPCOM000206528D.

Disclosed Anonymously, "Social Data Analysis as unobtrusive measure for validating human behavior assessment or test (Psychometric) results", IP.com Electronic Publication: Jun. 21, 2011, IP.com [online], Retrieved from: Prior Art Database, IP.com No. IPCOM000208050D.

Domingos et al., "Mining the Network Value of Customers", KDD '01 Proceedings of the Seventh ACM SIGKDD International Conference on Knowledge Discovery and Data Mining, ACM 1-58113-391-X.

Fast et al., "Personality as Manifest in Word Use: Correlations With Self-Report, Acquaintance Report, and Behavior", Journal of Personality and Social Psychology 2008, vol. 94, No. 2, 334-346, Copyright 2008 by the American Psychological Association 0022-3514/08/.

Dr. Jai Ganesh, "Social Analytics", Infosys Building Tomorrow's Enterprise, www.infosys.com, Copyright 2011 Infosys Limited.

Gill et al., "What Are They Blogging About? Personality, Topic and Motivation in Blogs", Proceedings of the Third International ICWSM Conference (2009), Copyright 2009 Association for the Advancement of Artificial Intelligence (www.aaai.org).

Goyal et al., "Learning Influence Probabilities in Social Networks", WSDM'10, Feb. 4-6, 2010, New Yrok City, New York, USA, Copyright 2010 ACM 978-1-60558-889-6/10/02.

(56) References Cited

OTHER PUBLICATIONS

Hall et al., "The WEKA Data Mining Software: An Update", ACM SIGKDD Explorations vol. 11, Issue 1, Jun. 2009, pp. 10-18.
Hoang et al., "Virality and Susceptibility in Information Diffusions", Proceedings of the Sixth International AAAI Conference on Weblogs and Social Media, Copyright 2012 Association for the Advancement of Artificial Intelligence (www.aaai.org), pp. 146-153.
Huang et al., "Exploring Social Influence via Posterior Effect of Word-of-Mouth Recommendations", WSDM'12, Feb. 8-12, 2012, Seattle Washington, USA, Copyright 2012 ACM 978-1-4503-0747-5/12/02.
IBM Social Business Team, "Using IBM Social Business to Take Your Business Relationships to the Next Level: A Game Changer for Small, Medium, and Large Businesses", IBM Redbooks Publication, REDP-4746-00, Apr. 5, 2011, pp. 1-16, © Copyright IBM Corp. 2011.
Jurczyk et al., "Discovering Authorities in Question Answer Communities by Using Link Analysis", CIKM '07, Nov. 6-8, 2007, Lisboa, Portugal, Copyright 2007 ACM 978-1-59593-803-9/07/0011, pp. 919-922.
Kempe et al., "Maximizing the Spread of Influence through a Social Network", SIGKDD '03 Washington, DC, USA, Copyright 2003 ACM 1-58113-737-0/03/0008.
Lee et al., "Uncovering Social Spammers: Social Honeypots + Machine Learning", SIGIR '10, Jul. 19-23, 2010, Geneva, Switzerland, Copyright 2010 ACM 978-160558-896-4/10/07.
Lee et al., "Seven Months with the Devils: A Long-Term Study of Content Polluters on Twitter", Copyright 2011 Association for the Advancement of Artificial Intelligence (www.aaai.org).
Leskovec et al., "Meme-tracking and the Dynamics of the News Cycle", KDD '09 Paris, France, Proceedings of the 15th ACM SIGKDD International Conference on Knowledge Discovery and Data Mining, Copyright 2009 ACM 978-1-60558-495-9.
Liu et al., "The Influence of Class Imbalance on Cost-Sensitive Learning: An Empirical Study", Proceedings of the Sixth International Conference on Data Mining (ICDM'06), Copyright 2006 IEEE.
LIWC, "LIWC: Linguistic Inquiry and Word Count", Jul. 23, 2011, p. 1, LIWC, Inc.
MacSkassy et al., "Why Do People Retweet? Anti-Homophily Wins the Day!", Proceedings of the Fifth International AAAI Conference on Weblogs and Social Media, Copyright 2011 Association for the Advancement of Artificial Intelligence (www.aaai.org).
Mairesse et al., "Words Mark the Nerds: Computational Models of Personality Recognition through Language", Proceedings of the 28th Annual Conference of the Cognitive Science Society, Jul. 2006, pp. 543-548, Cognitive Science Society, USA.
Pal, A. et al., "Early Detection of Potential Experts in Question Answering Communities", UMAP 2011, LNCS 6787, pp. 231-242, 2011, Copyright Springer-Verlag Berlin Heidelberg 2011.
Palmer et al., "An Experiential, Social Network-Based Approach to Direct Marketing", Direct Marketing: An International Journal, 2009, pp. 162-176, vol. 3, Iss: 3, Emerald Group Publishing Limited, United Kingdom.
Pennacchiotti et al., "A Machine Learning Approach to Twitter User Classification", Proceedings of the Fifth International AAAI Conference on Weblogs and Social Media, Jul. 2011, pp. 281-288, Copyright 2011, Association for the Advancement of Artificial Intelligence, (www.aaai.org).
Pennebaker et al., "Linguistic Inquiry and word Count", The University of Texas at Austin and The University of Auckland, New Zealand, Erlbaum, Publishers, Mahwah, NJ, www.erlbaum.com.
quora.com, "Press—Quora", 2009, pp. 1-2, Quora, USA.
Romero et al., "Differences in the Mechanics of Information Diffusion Across Topics: Idioms, Political Hashtags, and Complex Contagion on Twitter", WWW 2011, Mar. 28-Apr. 1, 2011, Hyderabad, India, ACM 978-1-4503-0632-4/11/03.
Romero et al., "Influence and Passivity in Social Media", WWW '11 Proceedings of the 20th International Conference on World Wide Web, Copyright 2011 ACM 978-1-4503-0637-9/11/03.
Schmotzer et al., "IBM LotusLive: A Social Networking and Collaboration Platform for the Midmarket", IBM Redbooks Publication, REDP-4728-00, Mar. 23, 2011, pp. 1-10, © Copyright IBM Corp. 2011.
Yaron Singer, "How to Win Friends and Influence People, Truthfully: Influence Maximization Mechanisms for Social Networks", WSDM '12 Feb. 8-12, 2012, Seattle, Washington, USA, Copyright 2012 ACM 978-1-4503-0747-5/12/02.
slickdeals.net, "Product Reviews—SlickDeals.net Forums", Nov. 28, 2010, pp. 1-4, Slickdeals, Inc., USA.
Tausczik et al., "The Psychological Meaning of Words: LIWC and Computerized Text Analysis Methods", Journal of Language and Social Psychology, pp. 24-54, vol. 29, No. 1, Copyright 2010 SAGE Publications.
Ver Steeg et al., "Information Transfer in Social Media", WWW 2012—Session: Information Diffusion in Social Networks, Apr. 16-20, 2012, Lyon, France, ACM 978-1-4503-1229-5/12/04.

* cited by examiner

SELECTING STRANGERS FOR INFORMATION SPREADING ON A SOCIAL NETWORK

This invention was made with Government support under W911NF-12-C-0028 awarded by Army Research Office. The Government has certain rights in the invention.

BACKGROUND

The present invention relates generally to social network analysis, and more particularly to selecting strangers for information spreading on a social network.

Social networks are more and more widely used for information sharing and exchange. Hundreds of millions of messages are posted on social networks daily. Due to widespread usage and growing number of users of social networks and due to businesses around social networks, there are enormous interests in modeling behaviors of the users of social networks. Such models benefit a number of objectives, such as viral marketing, spreading messages for social or political reasons, and protecting certain populations and organizations. Many models focus on macro levels of social networks rather than an individual's characteristics; the models don't describe how strangers in social networks spread information when asked by another stranger or strangers in social networks.

BRIEF SUMMARY

Embodiments of the present invention provide a method, computer program product, and system for selecting strangers for information spreading on a social network. In one embodiment, statistical models are trained with history data of the information spreading of strangers on the social network. The strangers on the social network are not known to a requester who requests the strangers on the social network to conduct the information spreading. Information spreading probabilities based on features, information reach, and information spreading probabilities based on a wait time of the strangers on the social network are computed. The wait time is a period of time for the strangers on the social network to initiate information spreading in response to being requested by the requester. Fitness scores of the strangers on the social network are computed. The fitness scores are a function of the information spreading probabilities based on features, the information reach, and the information spreading probabilities based on the wait time. Based on the fitness scores, the strangers on the social network are ranked in a sorted set. The strangers for the information spreading are selected from the sorted set. The one or more of the strangers for the information spreading are selected by determining an interval in the sorted set, and the interval satisfies an optimization objective of minimizing time for the information spreading within a confidence probability.

DETAILED DESCRIPTION

Figure 1:
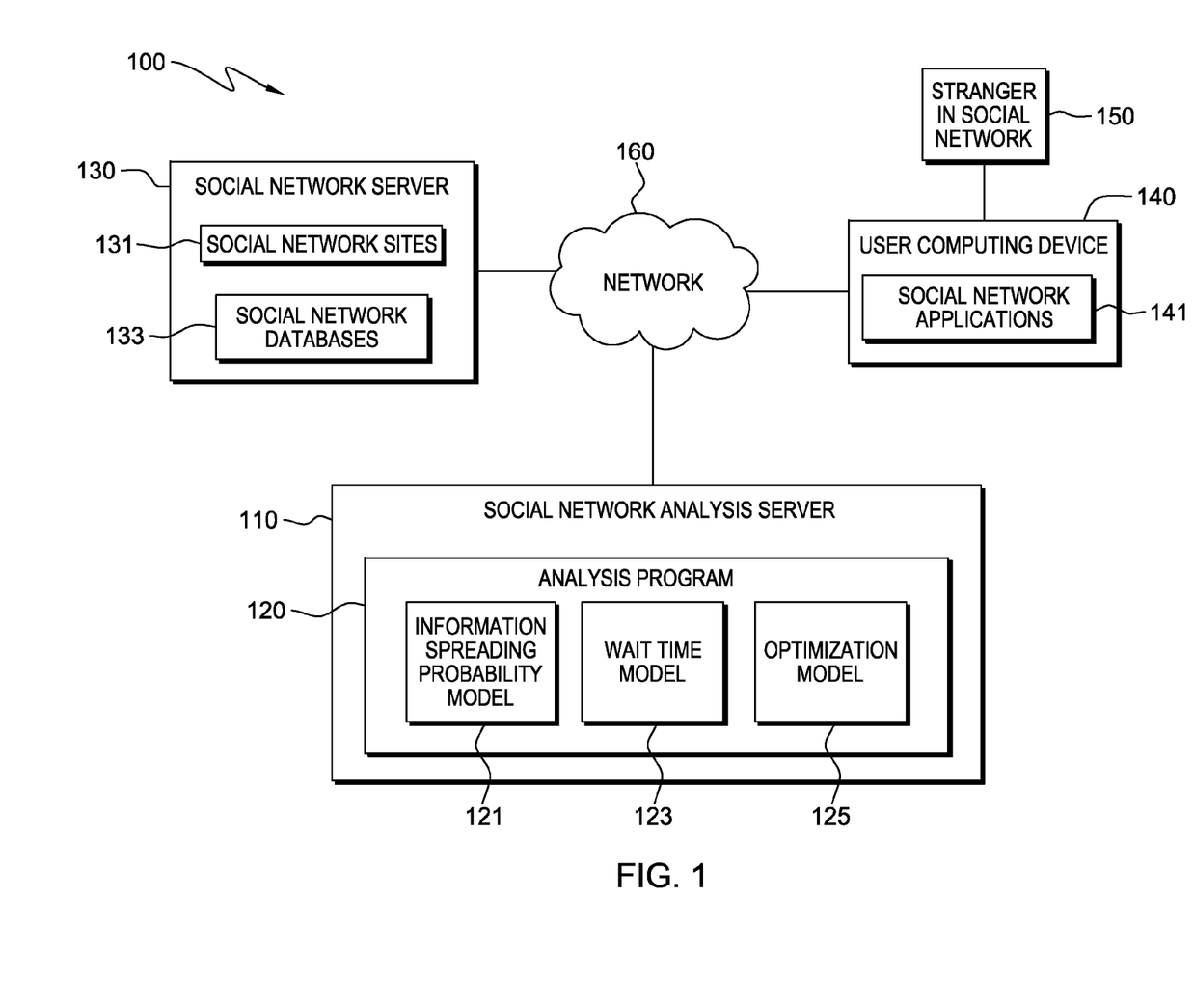
FIG. 1 is a diagram illustrating a computing environment for selecting strangers for information spreading on a social network, in accordance with an exemplary embodiment of the present invention.

FIG. 1 is a diagram illustrating computing environment 100 for selecting strangers for information spreading on a social network, in accordance with an exemplary embodiment of the present invention. Computing environment 100 includes social network analysis server 110, social network server 130, and user computing device 140 used by stranger 150 on the social network. Stranger 150 is one of the strangers on the social network; the strangers are not known to a requester who requests the strangers on the social network to conduct the information spreading. In the exemplary embodiment shown in FIG. 1, social network analysis server 110 is hosted by a computing device, so is social network server 130. In other embodiments, both social network analysis server 110 and social network server 130 may be hosted by a single computing device. In further other embodiments, social network analysis server 110 and/or social network server 130 may be hosted by a cluster of computing devices. User computing device 140 used by stranger 150 may be a desktop computer, a notebook/laptop computer, a tablet computer, a smartphone, a thin client, or any other computing device capable of receiving data from and sending data to social network server 130 and/or social network analysis server 110 via network 160. In the exemplary embodiment, social network analysis server 110, social network server 130, and user computer device 140 are connected by network 160. In the exemplary embodiment, network 160 is the Internet which represents a worldwide collection of networks and gateways to support communications between devices connected to the Internet. For example, network 160 may include wired, wireless, or fiber optic connections. In other embodiments, network 160 may be implemented as an intranet, a local area network (LAN), or a wide area network (WAN). In general, network 160 can be any combination of connections and protocols which support communications among social network analysis server 110, social network server 130, and user computing device 140.

Referring to FIG. 1, social network analysis server 110 includes analysis program 120. Analysis program 120 includes information spreading probability model 121, wait time model 123, and optimization model 125.

Information spreading probability model 121 is trained by ground-truth data collected from information spreading behavior of the strangers (e.g., stranger 150) in the social network when they are asked by one or more other strangers to spread information. The collection of the ground-truth data is done by using active engagement of the strangers, for example, by asking the strangers on a social network to spread specific information. The collection of the ground-truth information may also be retrieved by analysis program 120 from one or more social network databases 133 on social network server 130. Information spreading probability model 121 predicts a probability of information spreading by each of the strangers (for example stranger 150), based on features of each of the strangers. In one embodiment, information spreading probability model 121 is a classifier with two classes: information spreader and non-spreader.

Wait time model 123 estimates a probability of information spreading within a wait time by each of the strangers (for example stranger 150). The wait time is a period of time for the strangers on the social network to initiate information spreading in response to being requested by the requester. Wait time model 123 may also predict a wait time for the information spreading within a confidence probability. Wait time model 123 is trained based on history data of the wait time of each of the strangers for information spreading on one or more social networks. In one embodiment, wait time model 123 is an exponential distribution. It is assumed that each information spreading event follows a Poisson process in the sense that the each information spreading event occurs continuously and independently at a constant average rate. With this assumption, the exponential distribution is used to model a probability of information spreading within the wait time by each of the strangers (for example stranger 150). The probability density function (pdf) of the exponential distribution is $$f(t; \lambda) = \begin{cases} \lambda e^{-\lambda t}, & t \geq 0 \\ 0, & t < 0 \end{cases} \quad \text{(equation 1)}$$

where t is a random variable of wait time for one of the strangers (such as stranger 150) and λ is the rate parameter of the exponential distribution or the inverse of the average wait time of one of the strangers (such as stranger 150) determined based on the history data.

Optimization model 125 estimates a best interval in a sorted set of the strangers, to satisfy one or more optimization objectives. In the exemplary embodiments, the one or more optimization objectives include maximizing the information spreading rate, maximizing the unit information reach per person, minimizing the number of strangers needed for information spreading, and minimizing time needed for information spreading.

Referring to FIG. 1, social network server 130 hosts one or more social network sites 131 and one or more social network databases 133. One or more social network sites 131 (which are also called social networking sites) provide social networking services that focus on facilitating the building of social networks or social relations among people. The social networking services may include a group of Internet-based applications and allow the creation and exchange of user-generated content. Examples of the social networking services are Twitter® and Facebook®. One or more social network databases 133 host one or more datasets of the ground-truth data which are used for analysis program 120 on social network analysis server 110 to train models such as information spreading probability model 121 and wait time model 123.

Referring to FIG. 1, user computing device 140 used by stranger 150 includes one or more social network applications 141. One or more social network applications 141 are software applications, which are capable of receiving information input by stranger 150, transmitting the information to one or more computing devices used by other strangers, and transmitting the information to social network server 130 or social network analysis server 110.

Figure 2:
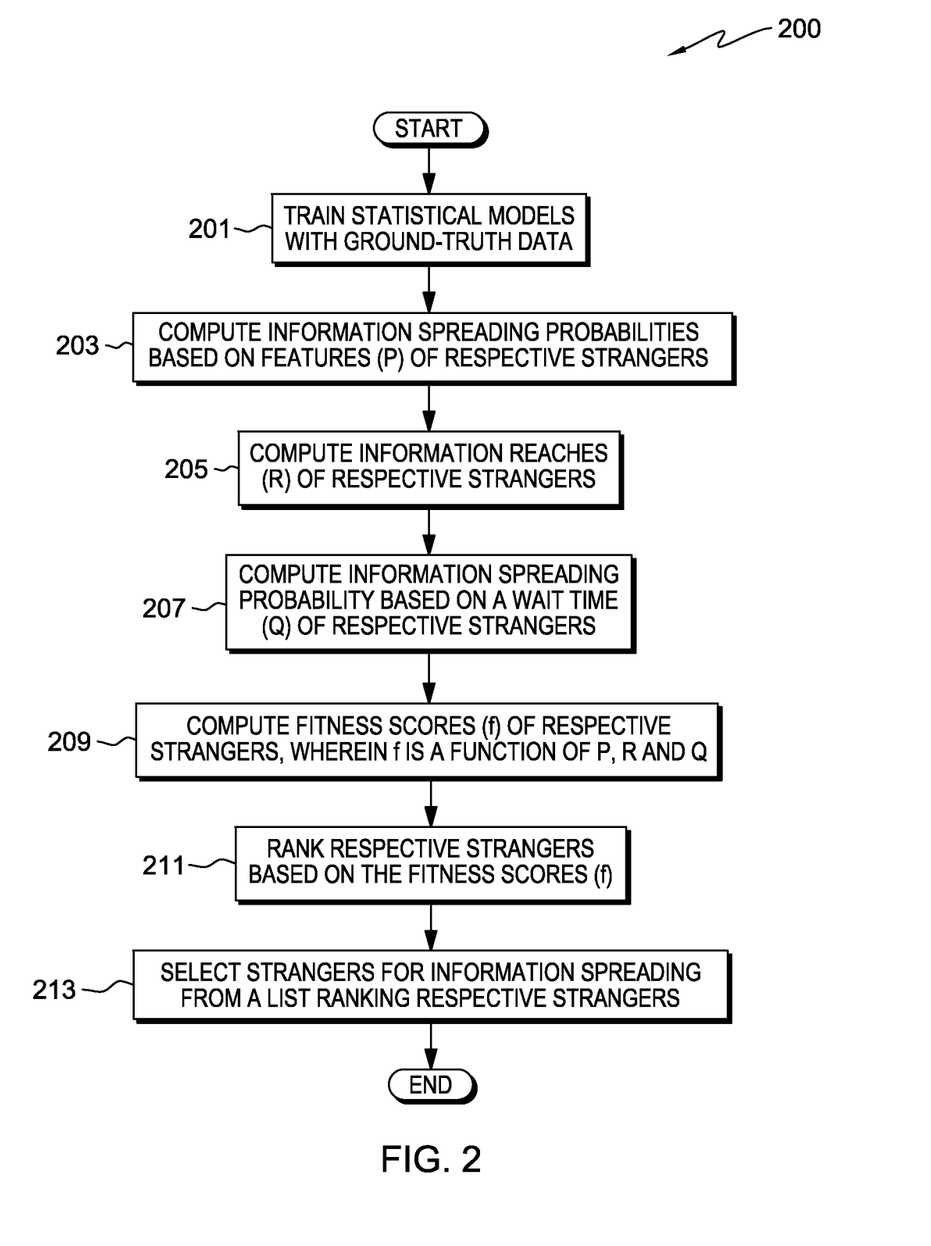
FIG. 2 is a flowchart illustrating operational steps of selecting strangers for information spreading on a social network, in accordance with an exemplary embodiment of the present invention.

FIG. 2 is flowchart 200 illustrating operational steps of selecting strangers for information spreading on a social network, in accordance with an exemplary embodiment of the present invention. In the exemplary embodiment, the operational steps of selecting strangers for information spreading on a social network are implemented by analysis program 120 on social network analysis server 110 (shown in FIG. 1).

Referring to FIG. 2, analysis program 120, at step 201, trains statistical models, namely information spreading probability model 121 and wait time models 123 (shown in FIG. 1), with ground-truth data. At this step, in order to train information spreading probability model 121, analysis program 120 uses one or more features, which include but are not limited to profile features, social network features, personality features, activity features, past information spreading features, and readiness features. The profile features of the respective strangers are extracted from profiles on one or more social network sites 131; for example, the profile features of the respective strangers include longevity of an account, length of a screen name, existence of a description in the account, length of the description, one or more URLs (uniform resource locators) in the account. The social network features indicate socialness of the respective strangers; for example, the social network features include the number of following (friends), number of followers, and the ratio of number of friends to number of followers. The personality features include information drawn from analyzing personality of the respective strangers. The activity features indicate how active the respective strangers are. The past information spreading features indicate quantity and rate of information spreading done by the respective strangers. The readiness features, for example, include information spreading likelihood in a day (ratio of the daily number of information spreading by a specific stranger to the total daily number of information spreading by all the strangers), information spreading likelihood in a hour (ratio of the hourly number of information spreading by a specific stranger to the total hourly number of information spreading by all the strangers), information spreading steadiness (i.e. 1/σ; σ is the standard deviation of the elapsed time between consecutive information spreading activities), and information spreading inactivity (an inactive period of time). In training information spreading probability model 121, analysis program 120 assigns different weights to the respective one or more features. At step 201, analysis program 120 trains wait time models 123 based on history data of wait times of the respective strangers for information spreading on one or more social networks. In one embodiment, wait time models 123 is the exponential distribution expressed in equation 1, one exponential distribution model is established for each of the strangers based on the prior wait time of information spreading. In training each exponential distribution model, analysis program 120 determines λ (shown in equation 1, which is the inverse of the average wait time) based on history data of the wait time in information spreading of each of the strangers.

Referring to FIG. 2, analysis program 120, at step 203, computes information spreading probabilities based on features ($P_1, P_2, \ldots, P_N$) of respective N strangers. The features are those mentioned in the last paragraph. For i-th stranger, analysis program 120 computes an information spreading probabilities based on features $P_i$. At step 205, analysis program 120 computes information reaches ($R_1, R_2, \ldots, R_N$) of respective N strangers at a certain level. For i-th stranger at the certain level, analysis program 120 computes the information reaches $R_i$. $R_i$ is defined as the number of peoples who can receive the update of the i-th stranger's social network update at the certain level. For example, the level is 1 and the social network is Twitter®, $R_i$ is the follower count of the i-th stranger.

At step 207, analysis program 120 computes information spreading probabilities based on wait time ($Q_1, Q_2, \ldots, Q_N$) of the respective N strangers. For i-th stranger, analysis program 120 computes the information spreading probability based on the wait time $Q_i$. In an embodiment, for a specific wait time T, using the exponential distribution model (equation 1), analysis program 120 predicts the probability of the information spreading within the specific wait time T of the i-th stranger, $Q_i(T)$.

At step 209, analysis program 120 computes fitness scores ($f_1, f_2, \ldots, f_N$) of the respective N strangers. For i-th stranger, analysis program 120 computes the fitness score $f_i$. The fitness score $f_i$ is a function of $P_i$, $R_i$ and $Q_i$ computed at steps 203, 205, and 207, respectively. In an embodiment, $f_i$ is a product of $P_i$, $R_i$, and $Q_i$ (i.e., $P_i \times R_i \times Q_i$). In other embodiments, $f_i$ may be a function of $[(P_i+R_i) \times Q_i]$ or a product of $P_i$ and $R_i$ (i.e., $P_i \times R_i$).

At step 211, analysis program 120 ranks, based on the fitness scores ($f_1, f_2, \ldots, f_N$), the respective N strangers. At this step, analysis program 120 sorts the respective N strangers according to the fitness scores. In the exemplary embodiment, through ranking the respective N strangers, analysis program 120 generates a sorted set of the respective N strangers according to the fitness scores.

At step 213, analysis program 120 selects, form the N respective strangers, strangers for information spreading. In an embodiment, analysis program 120 selects strangers with highest scores in the sorted set generated at step 211; the selected strangers are those whose fitness scores are above a certain threshold. In another embodiment, analysis program 120 selects strangers for information spreading by estimating a best interval of the sorted set generated at step 211. Analysis program 120 determines the best interval such that one or more optimization objectives are optimized. For example, the one or more optimization objectives include maximization of information spreading rate, maximization of unit information reach per stranger, and minimization of information spreading time. Determination of the best interval and the one or more optimization objectives are discussed in greater detail in later paragraphs with reference to FIG. 3.

Figure 3:
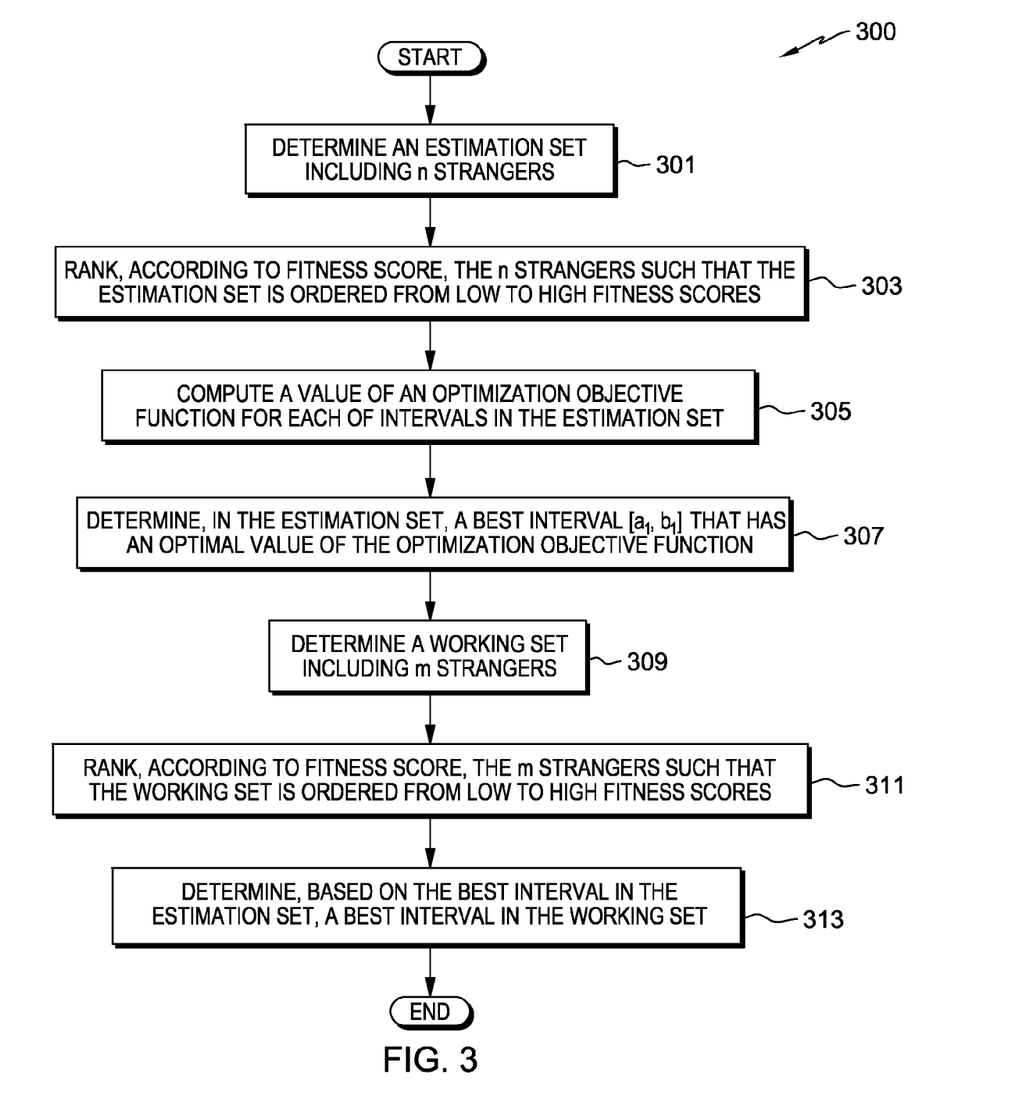
FIG. 3 is a flowchart illustrating operational steps of determining best intervals in sorted sets of strangers to achieve one or more optimizing objectives, in accordance with an exemplary embodiment of the present invention.

FIG. 3 is flowchart 300 illustrating operational steps of determining best intervals in sorted sets of strangers to achieve one or more optimizing objectives, in accordance with an exemplary embodiment of the present invention. In the exemplary embodiment, the operational steps of determining best intervals in sorted sets of strangers are implemented by analysis program 120, more particularly optimization model 125 on social network analysis server 110 (shown in FIG. 1).

Figure 4:
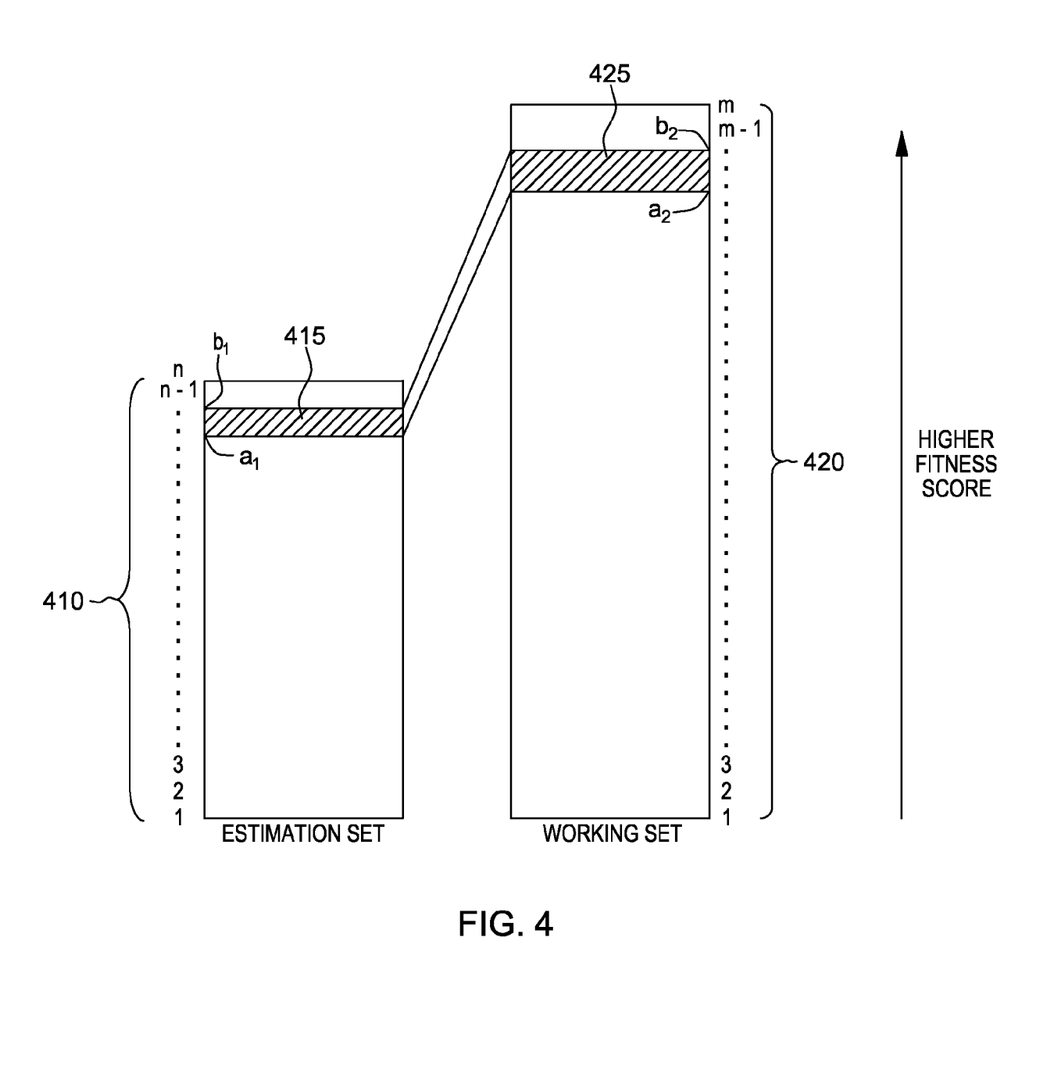
FIG. 4 is a diagram illustrating an estimation set, a working set of strangers, and a best interval in each of the sets, in accordance with an exemplary embodiment of the present invention.

Referring to FIG. 3, analysis program 120, at step 301, determines an estimation set which includes n of the N respective strangers and is a subset of a set including the N respective strangers. Analysis program 120 uses subset selection which is a process selecting a subset for use in model construction. As shown in later paragraphs, at following steps, a best interval in the estimation set is determined, and then the best interval in the estimation set is used to determine a best interval in a working set which is used to select strangers for information spreading on social networks. The estimation set and the working set are shown in FIG. 4, denoted by numerals 410 and 420 respectively. FIG. 4 is discussed in latter paragraphs with reference to steps in FIG. 3.

At step 303, analysis program 120 ranks, according to the fitness scores, the n strangers in the estimation set. In the exemplary embodiment, the estimation set is ordered such that the n strangers $\{1, 2, 3, \ldots, n\}$ are ordered in a sequence from low to high fitness scores. As shown in FIG. 4, in the exemplary embodiment, stranger 1 has lowest fitness score and is located on the bottom of the column, while stranger n has highest fitness score and is located on the top of the column.

At step 305, analysis program 120 computes a value of an optimization objective function for each of intervals in the estimation set. Analysis program 120 sets each of the intervals to k% of the n stranger in the estimation set. For example, analysis program 120 starts the first interval from the top (n shown in FIG. 4) and moves down 1% for each of the intervals, k% is 10% (or 0.10), and n is 100; therefore, the first interval is [91, 100], the second interval is [90, 99], the third interval is [89, 98], and so on.

Referring to step 305, in an embodiment, the optimization objective function is the information spreading rate. Analysis program 120 determines the information spreading rate, by calculating the ratio of strangers actually conducting information spreading to the total number of strangers being asked to conduct information spreading.

Referring to step 305, in another embodiment, the optimization objective function is unit-info-reach-per-stranger or simply information reach. Analysis program 120 calculates unit-info-reach-per-stranger, by using an equation defined as follows:

$$(UIRPS) = \frac{\sum_{i=1}^{k} (NF)_i}{(NS)} \quad \text{(equation 2)}$$

where (UIRPS) denotes the unit-info-reach per-stranger, k denotes the number of strangers actually conducting information spreading among strangers being asked to conduct information spreading, $(NF)_i$ denotes the number of followers of the i-th stranger, and (NS) denotes the number of strangers being asked to conduct information spreading. The unit-info-reach-per-stranger considers the cost of contacting strangers and the benefit of information spreading; the total cost is the number of strangers being asked (the denominator of equation 2) and the total benefit is the sum of all followers of k strangers (the numerator of equation 2). In the unit-info-reach-per-stranger expressed in equation 2, the total benefit is normalized by the total cost, thus the unit-info-reach-per-stranger represents the unit benefit per stranger. Note that it may be possible that a single follower may follow more than one of the strangers, and hence a better formulation will be to count the number of distinct followers in the numerator of equation 2.

Referring to step 305, in further another embodiment, the optimization objective function is a wait time for the information spreading. Analysis program 120 calculates the wait time for each of the strangers at a certain probability, by using the exponential distribution model shown in equation 1.

At step 307, analysis program 120 determines, in the estimation set, a best interval that has an optimal value of the optimization objective function. The best interval in the estimation set is $[a_1, b_1]$ shown in FIG. 4, denoted by numeral 415. The best interval satisfies one or more optimization objectives. In an embodiment, an optimization objective is to maximize the information spreading rate, and analysis program 120 finds the best interval that has a maximum value of the information spreading rate. In another embodiment, an optimization objective is to maximize the unit-info-reach-per-stranger, and analysis program 120 finds the best interval that has a maximum value of the unit-info-reach-per-stranger.

In further another embodiment, an optimization objective is to minimize the wait time, and analysis program 120 finds the best interval that has a minimum value of the wait time.

At step 309, analysis program 120 determines a working set including m strangers from which strangers for the information spreading on a social network are selected. The working set includes m of the N respective strangers, wherein m≤N. In the exemplary embodiment, the number of strangers in the working set, m, is greater than the number of strangers in the estimation set, n.

At step 311, analysis program 120 ranks, according to the fitness scores, the m strangers in the working set. In the exemplary embodiment, the working set is ordered such that the m strangers {1, 2, 3, . . . , m} are ordered in a sequence from low to high fitness scores. As shown in FIG. 4, in the exemplary embodiment, stranger 1 has lowest fitness score and is located on the bottom of the column, while stranger m has highest fitness score and is located on the top of the column.

At step 313, based on the best interval in the estimation set, analysis program 120 determines a best interval in the working set. As shown in FIG. 4, the best interval in the working set is $[a_2, b_2]$ and denoted by numeral 425, while the best interval in the estimation set is $[a_1, b_1]$ and denoted by numeral 415. The best interval $[a_1, b_1]$ in the estimation set defines the best interval $[a_2, b_2]$ in the working set, based on percentiles. In the exemplary embodiment, it is calculated that $$a_2 = \frac{a_1 \times m}{n} \quad \text{(equation 3)}$$

and $$b_2 = \frac{b_1 \times m}{n} \quad \text{(equation 4)}$$

Figure 5:
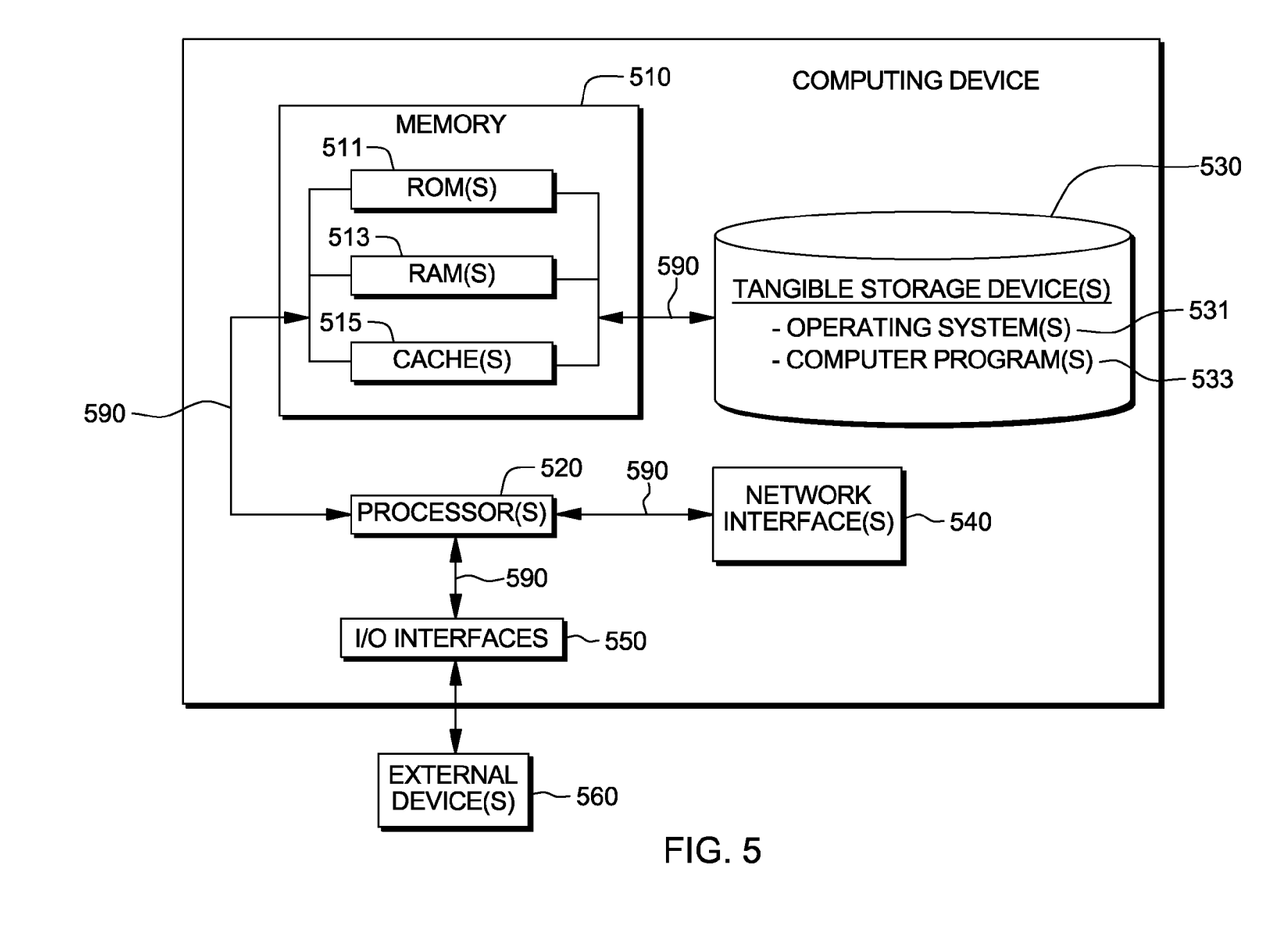
FIG. 5 is a diagram illustrating components of a computing device hosting a social media analysis server, a social network server, or a user computing device, in accordance with an exemplary embodiment of the present invention.

FIG. 5 is a diagram illustrating components of a computing device hosting social media analysis server 110, social network server 130, or user computing device 140 (shown in FIG. 1), in accordance with an exemplary embodiment of the present invention. It should be appreciated that FIG. 5 provides only an illustration of one implementation and does not imply any limitations with regard to the environment in which different embodiments may be implemented.

Referring to FIG. 5, the computing device includes processor(s) 520, memory 510, tangible storage device(s) 530, network interface(s) 540, and I/O (input/output) interface(s) 550. In FIG. 5, communications among the above-mentioned components of the computing device are denoted by numeral 590. Memory 510 includes ROM(s) (Read Only Memory) 511, RAM(s) (Random Access Memory) 513, and cache(s) 515.

One or more operating systems 531 and one or more computer programs 533 reside on one or more computer-readable tangible storage devices 530. In the exemplary embodiment, on a computing device hosting social media analysis server 110, one or more computer programs 533 include analysis program 120 (shown in FIG. 1) which comprises information spreading probability model 121, wait time model 123, and optimization model 125. In the exemplary embodiment, on a computing device hosting social network server 130, one or more social network sites 131 and one or more social network databases 133 (both shown in FIG. 1) reside on one or more computer-readable tangible storage devices 530. In the exemplary embodiment, on a computing device hosting user computing device 140, one or more social network applications 141 (shown in FIG. 1) reside on one or more computer-readable tangible storage devices 530.

The computing device further includes I/O interface(s) 550. I/O interface(s) 550 allow for input and output of data with external device(s) 560 that may be connected to the computing device. The computing device further includes network interface(s) 540 for communications between the computing device and a computer network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, and micro-code) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF (radio frequency), and any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for selecting strangers for information spreading on a social network, the method comprising:
    training statistical models with history data of the information spreading of strangers on the social network, the strangers on the social network being not known to a requester who requests the strangers on the social network to conduct the information spreading;
    computing information spreading probabilities based on features of the strangers on the social network;
    computing information reach of the strangers on the social network;
    computing information spreading probabilities based on a wait time of the strangers on the social network, the wait time being a period of time for the strangers on the social network to initiate information spreading in response to being requested by the requester;
    computing fitness scores of the strangers on the social network, the fitness scores being a function of: the information spreading probabilities based on features, the information reach, and the information spreading probabilities based on the wait time;
    ranking the strangers on the social network in a sorted set, based on the fitness scores;
    selecting one or more of the strangers for the information spreading from the sorted set; and
    wherein the one or more of the strangers for the information spreading are selected by determining an interval in the sorted set, the interval satisfies an optimization objective of minimizing time for the information spreading within a confidence probability.

2. The method of claim 1, wherein the one or more of the strangers for the information spreading are selected by determining an interval in the sorted set, the interval satisfies an optimization objective of maximizing an information spreading rate, the information spreading rate is a ratio of a number of strangers conducting the information spreading to a number of strangers being asked to conduct the information spreading.

3. The method of claim 1, wherein the one or more of the strangers for the information spreading are selected by determining an interval in the sorted set, the interval satisfies an optimization objective of maximizing unit information reach per stranger, the unit information reach per stranger is a sum of followers of strangers conducting the information spreading normalized by a number of strangers being asked to conduct the information spreading.

4. The method of claim 1, wherein the one or more of the strangers for the information spreading are selected by choosing strangers with highest fitness scores.

5. The method of claim 1, the method further comprising:
    determining a first set for subset selection, the first set including a portion of the strangers on the social network;
    ranking the first set based on the fitness scores;
    computing a value of an optimization objective function for each of intervals in the first set;
    determining an interval in the first set, the interval in the first set having an optimal value of the optimization objective function;
    determining a second set for selecting the one or more of the strangers for the information spreading;
    ranking the second set based on the fitness score; and
    determining an interval in the second set, the interval in the second set being defined by the interval in the first set, based on percentiles.

6. The method of claim 1, wherein the features are selected from the group consisting of profile features, social network features, personality features, activity features, past information spreading features, and readiness features, wherein the profile features are extracted form profiles of the strangers on the social network, the social network features indicate socialness the strangers on the social network, the personal features include information drawn from analyzing personality of the strangers on the social network, the activity features indicate how active the strangers on the social network are, the past information spreading features indicate quantity and rate of information spreading done by the strangers on the social network, and wherein the readiness features include information spreading likelihood in a day, information spreading likelihood in a hour, information spreading steadiness, and information spreading inactivity.

7. A computer program product for selecting strangers for information spreading on a social network, the computer program product comprising a computer readable storage medium having program code embodied therewith, the program code executable by a processor to:
- train statistical models with history data of the information spreading of strangers on the social network, the strangers on the social network being not known to a requester who requests the strangers on the social network to conduct the information spreading;
- compute information spreading probabilities based on features of the strangers on the social network;
- compute information reach of the strangers on the social network;
- compute information spreading probabilities based on a wait time of the strangers on the social network, the wait time being a period of time for the strangers on the social network to initiate information spreading in response to being requested by the requester;
- compute fitness scores of the strangers on the social network, the fitness scores being a function of the information spreading probabilities based on features, the information reach, and the information spreading probabilities based on the wait time;
- rank the strangers on the social network in a sorted set, based on the fitness scores;
- select one or more of the strangers for the information spreading from the sorted set; and
- wherein the one or more of the strangers for the information spreading are selected by determining an interval in the sorted set, the interval satisfies an optimization objective of minimizing time for the information spreading within a confidence probability.

8. The computer program product of claim 7, wherein the one or more of the strangers for the information spreading are selected by determining an interval in the sorted set, the interval satisfies an optimization objective of maximizing an information spreading rate, the information spreading rate is a ratio of a number of strangers conducting the information spreading to a number of strangers being asked to conduct the information spreading.

9. The computer program product of claim 7, wherein the one or more of the strangers for the information spreading are selected by determining an interval in the sorted set, the interval satisfies an optimization objective of maximizing unit information reach per stranger, the unit information reach per stranger is a sum of followers of strangers conducting the information spreading normalized by a number of strangers being asked to conduct the information spreading.

10. The computer program product of claim 7, wherein the one or more of the strangers for the information spreading are selected by choosing strangers with highest fitness scores.

11. The computer program product of claim 7, the computer program product further comprising the program code executable by the processor to:
- determine a first set for subset selection, the first set including a portion of the strangers on the social network;
- rank the first set based on the fitness scores;
- compute a value of an optimization objective function for each of intervals in the first set;
- determine an interval in the first set, the interval in the first set having an optimal value of the optimization objective function;
- determine a second set for selecting the one or more of the strangers for the information spreading;
- rank the second set based on the fitness score; and
- program instructions to determine an interval in the second set, the interval in the second set being defined by the interval in the first set, based on percentiles.

12. The computer program product of claim 7, wherein the features are selected from the group consisting of profile features, social network features, personality features, activity features, past information spreading features, and readiness features, wherein the profile features are extracted form profiles of the strangers on the social network, the social network features indicate socialness the strangers on the social network, the personal features include information drawn from analyzing personality of the strangers on the social network, the activity features indicate how active the strangers on the social network are, the past information spreading features indicate quantity and rate of information spreading done by the strangers on the social network, and wherein the readiness features include information spreading likelihood in a day, information spreading likelihood in a hour, information spreading steadiness, and information spreading inactivity.

13. A computer system for selecting strangers for information spreading on a social network, the computer system comprising:
- one or more processors, one or more computer-readable tangible storage devices, and program instructions stored on at least one of the one or more computer-readable tangible storage devices for execution by at least one of the one or more processors, the program instructions executable to:
- train statistical models with history data of the information spreading of strangers on the social network, the strangers on the social network being not known to a requester who requests the strangers on the social network to conduct the information spreading;
- compute information spreading probabilities based on features of the strangers on the social network;
- compute information reach of the strangers on the social network;
- compute information spreading probabilities based on a wait time of the strangers on the social network, the wait time being a period of time for the strangers on the social network to initiate information spreading in response to being requested by the requester;
- compute fitness scores of the strangers on the social network, the fitness scores being a function of the information spreading probabilities based on features, the information reach, and the information spreading probabilities based on the wait time;
- rank the strangers on the social network in a sorted set, based on the fitness scores;
- select one or more of the strangers for the information spreading from the sorted set; and
- wherein the one or more of the strangers for the information spreading are selected by determining an interval in the sorted set, the interval satisfies an optimization objective of minimizing time for the information spreading within a confidence probability.

14. The computer system of claim 13, wherein the one or more of the strangers for the information spreading are selected by determining an interval in the sorted set, the interval satisfies an optimization objective of maximizing an information spreading rate, the information spreading rate is a ratio of a number of strangers conducting the information spreading to a number of strangers being asked to conduct the information spreading.

15. The computer system of claim 13, wherein the one or more of the strangers for the information spreading are selected by determining an interval in the sorted set, the interval satisfies an optimization objective of maximizing unit information reach per stranger, the unit information reach per stranger is a sum of followers of strangers conducting the information spreading normalized by a number of strangers being asked to conduct the information spreading.

16. The computer system of claim 13, wherein the one or more of the strangers for the information spreading are selected by choosing strangers with highest fitness scores.

17. The computer system of claim 13, further comprising program instructions executable to:
- determine a first set for subset selection, the first set including a portion of the strangers on the social network;
- rank the first set based on the fitness scores;
- compute a value of an optimization objective function for each of intervals in the first set;
- determine an interval in the first set, the interval in the first set having an optimal value of the optimization objective function;
- determine a second set for selecting the one or more of the strangers for the information spreading;
- rank the second set based on the fitness score; and
- determine an interval in the second set, the interval in the second set being defined by the interval in the first set, based on percentiles.

* * * * *